(12) United States Patent
Barone et al.

(10) Patent No.: US 10,822,099 B2
(45) Date of Patent: Nov. 3, 2020

(54) PROPULSION SYSTEM FOR AN AIRCRAFT

(71) Applicant: General Electric Company, Schenectady, NY (US)

(72) Inventors: Dominic Barone, Centerville, OH (US); Paul Robert Gemin, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 791 days.

(21) Appl. No.: 15/605,247

(22) Filed: May 25, 2017

(65) Prior Publication Data
US 2018/0339780 A1 Nov. 29, 2018

(51) Int. Cl.
| | |
|---|---|
| *B64D 27/10* | (2006.01) |
| *B64D 27/16* | (2006.01) |
| *B64D 27/24* | (2006.01) |
| *F01D 15/10* | (2006.01) |
| *F02D 3/04* | (2006.01) |
| *B64D 35/02* | (2006.01) |
| *F02C 3/04* | (2006.01) |
| *B64D 27/02* | (2006.01) |

(52) U.S. Cl.
CPC ............ *B64D 27/24* (2013.01); *B64D 27/10* (2013.01); *B64D 27/16* (2013.01); *B64D 35/02* (2013.01); *F01D 15/10* (2013.01); *F02C 3/04* (2013.01); *B64D 2027/026* (2013.01); *B64D 2221/00* (2013.01); *F05D 2220/323* (2013.01); *Y02T 50/60* (2013.01)

(58) Field of Classification Search
None
See application file for complete search history.

(56) References Cited

U.S. PATENT DOCUMENTS

| | | | |
|---|---|---|---|
| 7,188,803 | B2 | 3/2007 | Ishiba |
| 8,159,082 | B2 | 4/2012 | Gemin et al. |
| 8,636,241 | B2 | 1/2014 | Lugg et al. |
| 8,960,592 | B1 | 2/2015 | Windisch |
| 9,193,311 | B2 | 11/2015 | Siegel et al. |
| 2014/0182560 | A1 | 7/2014 | Veit et al. |
| 2015/0001338 | A1 | 1/2015 | Siegel et al. |
| 2015/0151844 | A1 | 6/2015 | Anton et al. |
| 2015/0211512 | A1 | 7/2015 | Wiegman et al. |

(Continued)

OTHER PUBLICATIONS http://ecatalog.weg.net/files/wegnet/WEG-the-abcs-of-synchronous-motors-usaem200syn42-brochure-english.pdf.

(Continued)

*Primary Examiner* — Jared Fureman
*Assistant Examiner* — Aqeel H Bukhari
(74) *Attorney, Agent, or Firm* — Dority & Manning, P.A.

(57) ABSTRACT

A propulsion system for an aircraft includes an electric generator mechanically driven by a combustion engine, with the electric generator configured to generate alternating current electrical power. The propulsion system additionally includes a power bus electrically connected to the electric generator and configured to receive and transmit the alternating current electrical power generated by the electric generator. Additionally, the propulsion system includes, an electric propulsor assembly comprising an electric motor and a propulsor drivingly connected to the electric motor, the electric motor electrically coupled to the power bus for the receiving alternating current electrical power from the power bus.

19 Claims, 9 Drawing Sheets

(56) References Cited

U.S. PATENT DOCUMENTS

| | | |
|---|---|---|
| 2016/0016670 A1 | 1/2016 | Sautreuil et al. |
| 2016/0114885 A1 | 4/2016 | Tsunekawa et al. |
| 2016/0214727 A1 | 7/2016 | Hamel et al. |
| 2016/0236790 A1* | 8/2016 | Knapp .................... B64C 11/44 |
| 2016/0325629 A1 | 11/2016 | Siegel et al. |
| 2016/0340051 A1 | 11/2016 | Edwards et al. |
| 2016/0362187 A1 | 12/2016 | Armstrong et al. |
| 2017/0349293 A1* | 12/2017 | Klemen .................. B60L 50/15 |
| 2018/0251228 A1* | 9/2018 | Sands ..................... F01D 15/12 |

OTHER PUBLICATIONS http://www.electricaleasy.com/2014/02/starting-of-three-phase-induction-motors.html.

Partial European Search Report Corresponding to Application No. 18173393 dated Aug. 6, 2018.

\* cited by examiner

PROPULSION SYSTEM FOR AN AIRCRAFT

FIELD

The present subject matter relates generally to an aircraft propulsion system, and more particularly to an aircraft propulsion system operating on alternating current electrical power.

BACKGROUND

A conventional commercial aircraft generally includes a fuselage, a pair of wings, and a propulsion system that provides thrust. The propulsion system typically includes at least two aircraft engines, such as turbofan jet engines. Each turbofan jet engine is mounted to a respective one of the wings of the aircraft, such as in a suspended position beneath the wing, separated from the wing and fuselage.

More recently, propulsion systems have been proposed of a hybrid-electric design. With these propulsion systems, an electric power source may provide electric power to an electric fan to power the electric fan. More specifically, a power bus may transfer electrical power from the electric power source to the electric fan. These systems transmit electrical power in a direct current form, as is conventionally known to be a more appropriate form of electrical power transmission, especially at relatively high altitudes.

With such systems, the electrical power may be generated in alternating current form and/or the electrical power may be utilized in alternating current form. Accordingly, the power bus includes switching stations, or terminal stations, to convert the electrical power between alternating current form and direct current form. However, these switching stations, or terminal stations, can be relatively heavy leading to inefficiencies with the hybrid-electric aircraft designs. Accordingly, a propulsion system for an aircraft capable of overcoming these deficiencies would be useful.

BRIEF DESCRIPTION

Aspects and advantages of the invention will be set forth in part in the following description, or may be obvious from the description, or may be learned through practice of the invention.

In one exemplary embodiment of the present disclosure a propulsion system for an aircraft is provided. The propulsion system includes a combustion engine, and an electric generator mechanically driven by the combustion engine. The electric generator is configured to generate alternating current electrical power. The propulsion system additionally includes a power bus electrically connected to the electric generator and configured to receive and transmit the alternating current electrical power generated by the electric generator. Additionally, the propulsion system includes, an electric propulsor assembly comprising an electric motor and a propulsor drivingly connected to the electric motor, the electric motor electrically coupled to the power bus for the receiving alternating current electrical power from the power bus. Moreover, at least one of the power bus or the electric propulsor assembly includes a current limiting means selectively connectable in series with the electric motor of the electric propulsor assembly for limiting a current provided to the electric motor.

In certain exemplary embodiments the electric generator is a variable frequency electric generator configured to generate alternating current electrical power at various frequencies, wherein the power bus is configured to transmit the alternating current electrical power from the electric generator to the electric motor at the various frequencies. For example, in certain exemplary aspects the electric generator is configured to generate the alternating current electrical power at various frequencies proportional to a rotational speed of the combustion engine.

In certain exemplary embodiments the electric generator includes a number of poles, wherein the electric motor includes a number of poles, wherein the number of poles of the electric generator is different than the number of poles of the electric motor.

In certain exemplary embodiments the current limiting means includes at least one of a resistor or a power converter selectively connectable in series with the electric motor of the electric propulsor assembly.

In certain exemplary embodiments the propulsor is a variable pitch propulsor.

In certain exemplary embodiments the combustion engine is at least one of a turboprop engine, turbofan engine, or turboshaft engine.

In certain exemplary embodiments the electric motor and propulsor of the electric propulsor assembly are together configured as a first electric fan, and wherein the electric propulsor assembly further comprises a second electric fan, the second electric fan similarly comprising an electric motor and a propulsor drivingly connected to the electric motor, the electric motor of the second electric fan also electrically coupled to the power bus for the receiving alternating current electrical power from the power bus.

In an exemplary aspect of the present disclosure, a method for operating a propulsion system of an aircraft is provided. The propulsion system includes a combustion engine, an electric generator mechanically driven by the combustion engine, a power bus, and an electric propulsor assembly having an electric motor and a propulsor. The method includes operating the combustion engine to drive the electric generator, generating alternating current electrical power with the electric generator, transferring the alternating current electric power through the power bus to the electric motor of the electric propulsor assembly to power the electric motor, and driving the propulsor of the electric propulsion assembly with the electric motor. The method also includes modifying a variable geometry component of the electric propulsor assembly to modify a load on the electric motor.

In certain exemplary aspects generating alternating current electrical power includes generating alternating current electrical power at a first frequency, wherein transferring the alternating current electric power through the power bus to the electric motor includes transferring the alternating current electric power at the first frequency through the power bus to the electric motor, and wherein the method further includes generating alternating current electrical power at a second frequency with the electric generator subsequent to generating alternating current electrical power at the first frequency, and transferring the alternating current electric power at the second frequency through the power bus to the electric motor of the electric propulsor assembly to power the electric motor. For example, in certain exemplary aspects driving the propulsor of the electric propulsion assembly with the electric motor comprises driving the propulsor of the electric propulsor assembly at a first rotational speed in response to the transfer of the alternating current electric power at the first frequency through the power bus to the electric motor. Additionally, with such an exemplary aspect, the method may further include driving the propulsor of the electric propulsor assembly at a second rotational speed in response to the transfer of the alternating current electric power at the second frequency through the power bus to the electric motor.

In certain exemplary aspects the method further includes determining a full rotational speed of the electric motor based at least in part on a rotational speed of the electric generator, and determining the electric motor is operating below a predetermined threshold of the full rotational speed. With such an exemplary aspect, transferring the alternating current electric power through the power bus to the electric motor may include limiting an amount of current provided to the electric motor in response to determining the electric motor is operating below the predetermined threshold of the full rotational speed. For example, in certain exemplary aspects limiting the amount of current provided to the electric motor includes transferring the alternating current electric power through at least one of a resistor or a power converter to the electric motor.

In certain exemplary aspects the method further includes determining a full rotational speed of the electric motor based at least in part on a rotational speed of the electric generator, and determining the electric motor is operating below a predetermined threshold of the full rotational speed, wherein modifying the variable geometry component of the electric propulsion assembly to modify the load on the electric motor includes modifying the variable geometry component of the electric propulsion assembly to reduce the load on the electric motor in response to determining the electric motor is operating below the predetermined threshold of the full rotational speed. For example, in certain exemplary aspects modifying the variable geometry component of the electric propulsion assembly includes changing a pitch of a plurality of blades of the propulsor of the electric propulsor assembly.

In certain exemplary aspects the method further includes determining a slip of the electric motor of the electric propulsor assembly is outside a predetermined operating slip threshold, wherein modifying the variable geometry component of the electric propulsion assembly to modify the load on the electric motor includes modifying the variable geometry component of the electric propulsion assembly to modify the load on the electric motor in response to determining the slip of the electric motor of the electric propulsor assembly is outside the predetermined operating slip threshold. For example, in certain exemplary aspects modifying the variable geometry component of the electric propulsion assembly includes changing a pitch of a plurality of blades of the propulsor of the electric propulsor assembly.

In certain exemplary aspects the electric motor of the electric propulsor assembly is a wound field electric motor, and the method further includes determining a system parameter, wherein with such an exemplary aspect generating alternating current electrical power with the electric generator further includes modifying a voltage of the alternating current electrical power generated with the electric generator in response to the determined system parameter.

In another exemplary embodiment of the present disclosure, a propulsion system for an aircraft is provided. The propulsion system includes a combustion engine and an electric generator mechanically driven by the combustion engine, the electric generator configured to generate alternating current electrical power and defining a number of poles. The propulsion system further includes a power bus electrically connected to the electric generator and configured to receive and transmit the alternating current electrical power generated by the electric generator. The propulsion system further includes an electric propulsor assembly having an electric motor and a propulsor drivingly connected to the electric motor, the electric motor electrically coupled to the power bus for the receiving alternating current electrical power from the power bus, the electric motor defining a number of poles that is different than the number of poles defined by the electric generator.

In certain exemplary embodiment the number of poles of the electric generator is less than the number of poles of the electric motor, such as less than half the number of poles of the electric motor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
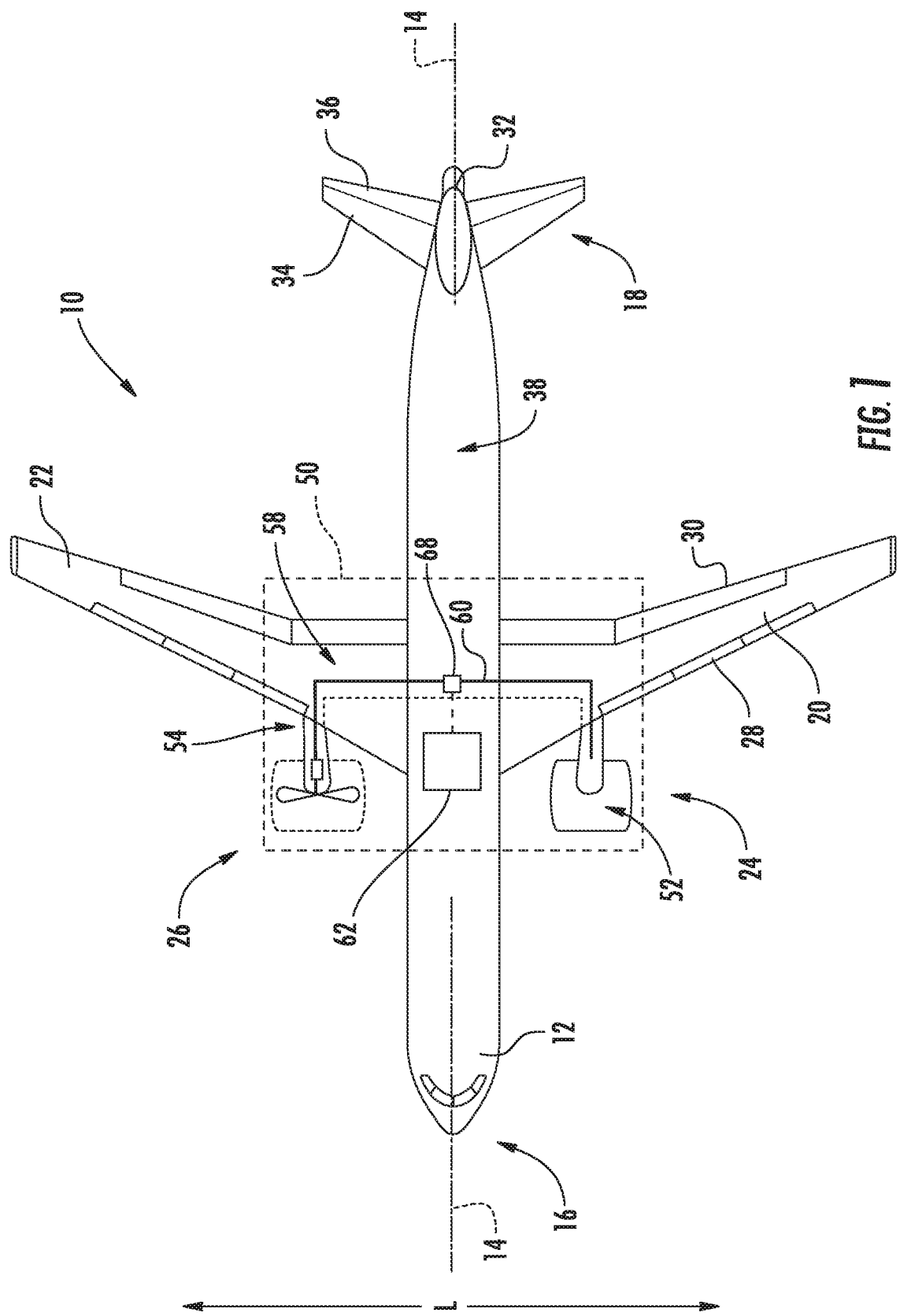
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", "third", etc. may be used interchangeably to distinguish one component from another and are not intended to signify location or importance of the individual components.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

As used herein, the terms "processor" and "computer," and related terms, e.g., "processing device," "computing device," and "controller", are not limited to just those integrated circuits referred to in the art as a computer, but further broadly refers to one or more processing devices including one or more of a microcontroller, a microcomputer, a programmable logic controller (PLC), an application specific integrated circuit, and other programmable circuits, and these terms are used interchangeably herein. In the embodiments described herein, the computer or controller may additionally include memory. The memory may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, the computer or controller may include one or more input channels and/or one or more output channels. The input channels may be, but are not limited to, computer peripherals associated with an operator interface such as a mouse and a keyboard, or sensors, such as engine sensors associated with an engine, such as a gas turbine engine, for determining operating parameters of the engine. Furthermore, in the exemplary embodiment, the output channels may include, but are not be limited to, an operator interface monitor, or the output channels may be linked to various components to control such components based, e.g., on data reviewed from the input channels and/or data or instructions stored in the memory. For example, the memory may store software or other instructions, which when executed by the controller or processor allow the controller to perform certain operations or functions. The term "software" may include any computer program stored in memory, or accessible by the memory, for execution by, e.g., the controller, processor, clients, and servers.

Referring now to the drawings, wherein identical numerals indicate the same elements throughout the figures, FIG. 1 provides a top view of an exemplary aircraft 10 as may incorporate various embodiments of the present disclosure. As shown in FIG. 1, the aircraft 10 defines a longitudinal centerline 14 that extends therethrough, a lateral direction L, a forward end 16, and an aft end 18. Moreover, the aircraft 10 includes a fuselage 12, extending longitudinally from the forward end 16 of the aircraft 10 to the aft end 18 of the aircraft 10, and a wing assembly including a port side and a starboard side. More specifically, the port side of the wing assembly is a first, port side wing 20, and the starboard side of the wing assembly is a second, starboard side wing 22. The first and second wings 20, 22 each extend laterally outward with respect to the longitudinal centerline 14. The first wing 20 and a portion of the fuselage 12 together define a first side 24 of the aircraft 10, and the second wing 22 and another portion of the fuselage 12 together define a second side 26 of the aircraft 10. For the embodiment depicted, the first side 24 of the aircraft 10 is configured as the port side of the aircraft 10, and the second side 26 of the aircraft 10 is configured as the starboard side of the aircraft 10.

Each of the wings 20, 22 for the exemplary embodiment depicted includes one or more leading edge flaps 28 and one or more trailing edge flaps 30. The aircraft 10 further includes a vertical stabilizer 32 having a rudder flap (not shown) for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration. For example, in other embodiments, the aircraft 10 may include any other configuration of stabilizer.

Figure 2:
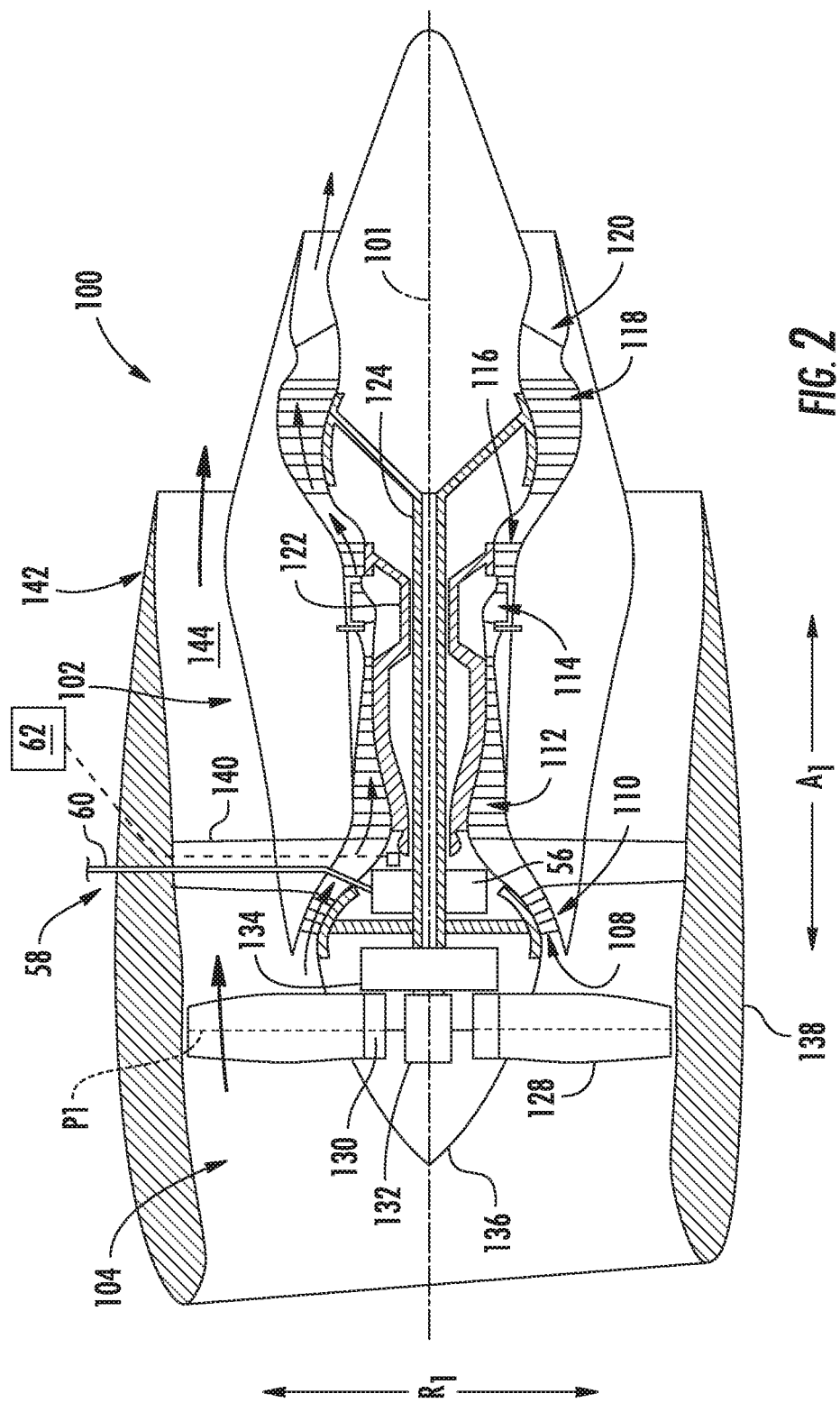
FIG. 2 is a schematic, cross-sectional view of a gas turbine engine as may be mounted to the exemplary aircraft of FIG. 1.
Figure 3:
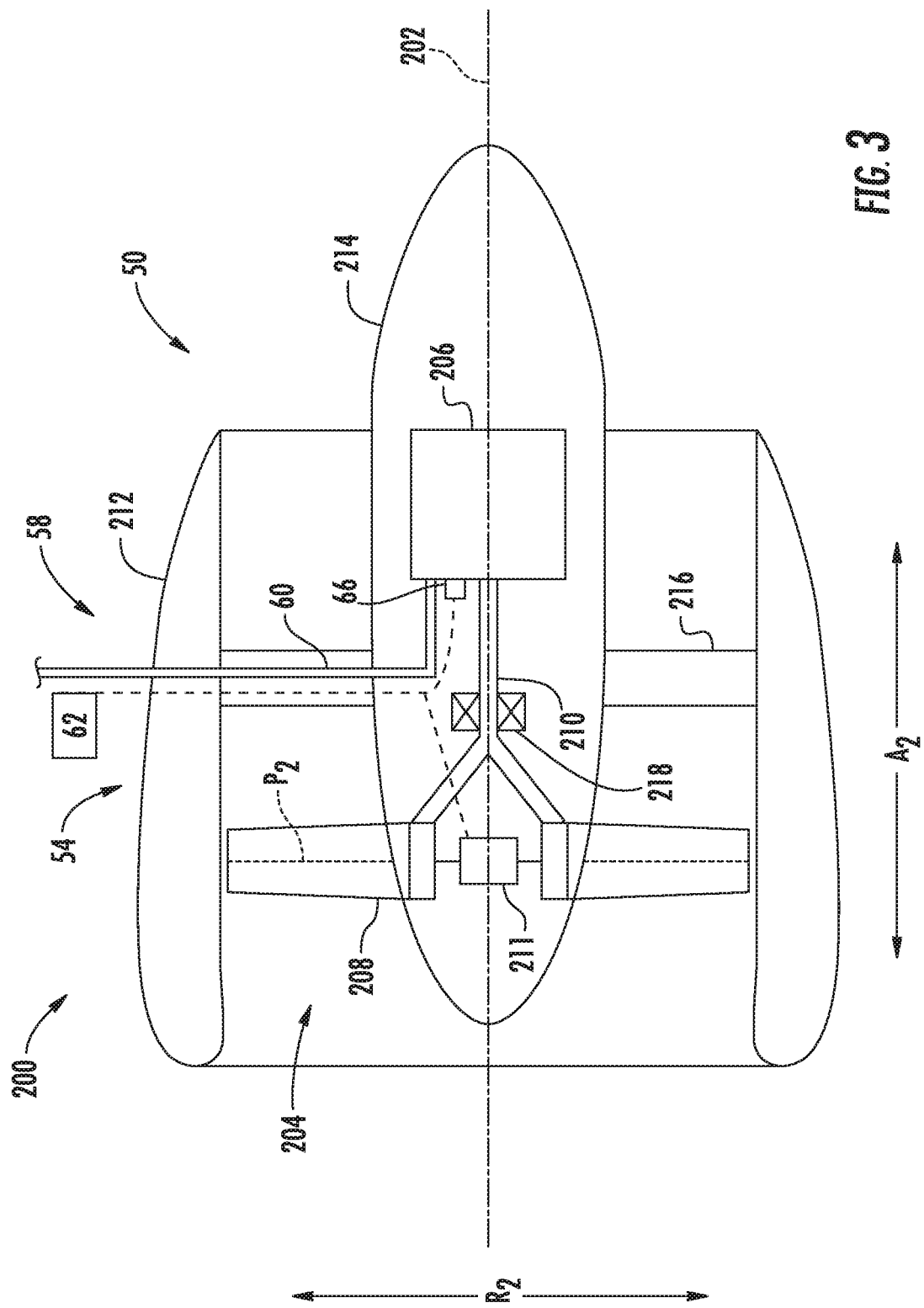
FIG. 3 is a schematic, cross-sectional view of an electric fan assembly in accordance with an exemplary embodiment of the present disclosure.

Referring now also to FIGS. 2 and 3, the exemplary aircraft 10 of FIG. 1 additionally includes a propulsion system 50 having a first propulsor assembly 52 and a second propulsor assembly 54. FIG. 2 provides a schematic, cross-sectional view of the first propulsor assembly 52, and FIG. 3 provides a schematic, cross-sectional view of the second propulsor assembly 54. As is depicted, each of the first propulsor assembly 52 and second propulsor assembly 54 are configured as under-wing mounted propulsor assemblies.

Referring particularly to FIGS. 1 and 2, the first propulsor assembly 52 is mounted, or configured to be mounted, to the first side 24 of the aircraft 10, or more particularly, to the first wing 20 of the aircraft 10. The first propulsor assembly 52 generally includes a combustion engine and a propulsor, and more specifically includes a turbomachine 102 and a primary fan (referred to simply as a "fan 104" with reference to FIG. 2). More specifically, for the embodiment depicted the first propulsor assembly 52 is configured as a turbofan engine 100 (i.e., the turbomachine 102 and the fan 104 are configured as part of the turbofan 100).

As shown in FIG. 2, the turbofan 100 defines an axial direction A1 (extending parallel to a longitudinal centerline 101 provided for reference) and a radial direction R1. As stated, the turbofan 100 includes the fan 104 and the turbomachine 102 disposed downstream from the fan 104.

The exemplary turbomachine 102 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a first, low pressure (LP) turbine 118 and a second, high pressure (HP) turbine 116; and a jet exhaust nozzle section 120.

The exemplary turbomachine 102 of the turbofan 100 additionally includes one or more shafts rotatable with at least a portion of the turbine section and, for the embodiment depicted, at least a portion of the compressor section. More particularly, for the embodiment depicted, the turbofan 100 includes a high pressure (HP) shaft or spool 122, which drivingly connects the HP turbine 116 to the HP compressor 112. Additionally, the exemplary turbofan 100 includes a low pressure (LP) shaft or spool 124, which drivingly connects the LP turbine 118 to the LP compressor 110.

Further, the exemplary fan 104 depicted is configured as a variable pitch fan having a plurality of fan blades 128 coupled to a disk 130 in a spaced apart manner. The fan blades 128 extend outwardly from disk 130 generally along the radial direction R1. Each fan blade 128 is rotatable relative to the disk 130 about a respective pitch axis P1 by virtue of the fan blades 128 being operatively coupled to a suitable actuation member 132 configured to collectively vary the pitch of the fan blades 128. The fan 104 is mechanically coupled to the LP shaft 124, such that the fan 104 is mechanically driven by the first, LP turbine 118. More particularly, the fan 104, including the fan blades 128, disk 130, and actuation member 132, is mechanically coupled to the LP shaft 124 through a power gearbox 134, and is rotatable about the longitudinal axis 101 by the LP shaft 124 across the power gear box 134. The power gear box 134 includes a plurality of gears for stepping down the rotational speed of the LP shaft 124 to a more efficient rotational fan speed. Accordingly, the fan 104 is powered by an LP system (including the LP turbine 118) of the turbomachine 102.

Referring still to the exemplary embodiment of FIG. 2, the disk 130 is covered by rotatable front hub 136 aerodynamically contoured to promote an airflow through the plurality of fan blades 128. Additionally, the turbofan 100 includes an annular fan casing or outer nacelle 138 that circumferentially surrounds the fan 104 and/or at least a portion of the turbomachine 102. Accordingly, the exemplary turbofan 100 depicted may be referred to as a "ducted" turbofan engine. Moreover, the nacelle 138 is supported relative to the turbomachine 102 by a plurality of circumferentially-spaced outlet guide vanes 140. A downstream section 142 of the nacelle 138 extends over an outer portion of the turbomachine 102 so as to define a bypass airflow passage 144 therebetween.

Referring still to FIG. 2, the propulsion system 50 additionally includes an electric machine, which for the embodiment depicted is configured as an electric generator 56. The electric generator 56 and turbofan engine 100 may generally be referred to herein as an electric power source of the propulsion system 50. Additionally, the electric generator 56 is, for the embodiment depicted, positioned within the turbomachine 102 of the turbofan engine 100 and is in mechanical communication with one of the shafts of the turbofan engine 100 (i.e., the electric generator 56 is mechanically driven by one of the shafts of the turbofan engine 100). More specifically, for the embodiment depicted, the electric generator is driven by the first, LP turbine 118 through the LP shaft 124. The electric generator 56 is configured to convert mechanical power of the LP shaft 124 to electric power. Accordingly, the electric generator 56 is also powered by the LP system (including the LP turbine 118) of the turbomachine 102. Moreover, as will be discussed in greater detail below, the electric generator 56 is generally configured to generate alternating current electrical power.

It should be appreciated, however, that in other exemplary embodiments, the electric generator 56 may instead be positioned at any other suitable location within the turbomachine 102 or elsewhere, and may be, e.g., driven by the turbofan engine (or any other combustion engine) in any other suitable manner. For example, the electric generator 56 may be, in other embodiments, mounted coaxially with the LP shaft 124 within the turbine section, or alternatively may be offset from the LP shaft 124 and driven through a suitable gear train. Additionally, or alternatively, in other exemplary embodiments, the electric generator 56 may instead be powered by the HP system, i.e., by the HP turbine 116 through the HP shaft 122, or by both the LP system (e.g., the LP shaft 124) and the HP system (e.g., the HP shaft 122) via a dual drive system.

It should further be appreciated that the exemplary turbofan engine 100 depicted in FIG. 2 may, in other exemplary embodiments, have any other suitable configuration. For example, in other exemplary embodiments, the fan 104 may not be a variable pitch fan, and further, in other exemplary embodiments, the LP shaft 124 may be directly mechanically coupled to the fan 104 (i.e., the turbofan engine 100 may not include the gearbox 134). Further, it should be appreciated that in other exemplary embodiments, the first propulsor assembly 52 may include any other suitable type of engine. For example, in other embodiments, the turbofan engine 100 may instead be configured as a turboprop engine or an unducted turbofan engine. Additionally, in other embodiments the turbofan engine 100 may instead be configured as any other suitable combustion engine for driving the electric generator 56. For example, in other embodiments, the turbofan engine may be configured as a turboshaft engine (see, e.g., FIG. 4), or any other suitable combustion engine, such as an internal combustion engine.

Referring still to FIGS. 1 and 2, the propulsion system 50 depicted additionally includes an electrical power bus 58 to allow the electric generator 56 to be in electrical communication with one or more other components of the propulsion system 50 and/or the aircraft 10. For the embodiment depicted, the electrical power bus 58 includes one or more electrical cables or lines 60 connected to the electric generator 56, and for the embodiment depicted, extending through one or more of the outlet guide vanes 140. As will be discussed in greater detail below, the electric power bus is generally configured to receive and transmit the alternating current electric power generated by the electric generator 56.

Referring now particularly to FIGS. 1 and 3, the exemplary propulsion system 50 additionally includes the second propulsor assembly 54 positioned, or configured to be positioned, at a location spaced apart from the first propulsor assembly 52. More specifically, for the embodiment depicted, the second propulsor assembly 54 is mounted at a location away from the first propulsor assembly 52 along the lateral direction L such that they ingest different airstreams along the lateral direction L. However, in other embodiments, the first and second propulsor assemblies 52, 54 may each be mounted to the aircraft 10 using a common mount. With such a configuration, however, the first and second propulsor assemblies 52, 54 may still be positioned on the mount in a manner such that they are spaced apart from one another, e.g., along the lateral direction L such that they ingest different airstreams along the lateral direction L.

Referring still to the exemplary embodiment of FIGS. 1 and 3, the second propulsor assembly 54 is mounted to the second side 26 of the aircraft 10, or rather to the second wing 22 of the aircraft 10. Referring particularly to FIG. 3, the second propulsor assembly 54 is generally configured as an electric propulsion assembly including an electric motor and a propulsor drivingly connected to the electric motor. More particularly, for the embodiment depicted, the electric propulsion assembly includes an electric fan 200, the electric fan 200 including an electric motor 206 and a propulsor/fan 204. The electric fan 200 defines an axial direction A2 extending along a longitudinal centerline axis 202 that extends therethrough for reference, as well as a radial direction R2. For the embodiment depicted, the fan 204 is rotatable about the centerline axis 202 by the electric motor 206.

The fan 204 includes a plurality of fan blades 208 and a fan shaft 210 drivingly connecting the fan 204 to the electric motor 206. The plurality of fan blades 208 are attached to/rotatable with the fan shaft 210 and spaced generally along a circumferential direction of the electric fan 200 (not shown). In certain exemplary embodiments, the plurality of fan blades 208 may be attached in a fixed manner to the fan shaft 210, or alternatively, the plurality of fan blades 208 may be rotatable relative to the fan shaft 210, such as in the embodiment depicted. For example, the plurality of fan blades 208 each define a respective pitch axis P2, and for the embodiment depicted are attached to the fan shaft 210 such that a pitch of each of the plurality of fan blades 208 may be changed, e.g., in unison, by a pitch change mechanism 211. Changing the pitch of the plurality of fan blades 208 may increase an efficiency of the second propulsor assembly 54 and/or may allow the second propulsor assembly 54 to achieve a desired thrust profile. Further, as will be discussed below, changing the pitch of the plurality of fan blades 208 may adjust a load on the electric motor 206 during operation of the electric motor 206. With such an exemplary embodiment, the fan 204 may be referred to as a variable pitch fan.

Moreover, for the embodiment depicted, the electric fan 200 depicted additionally includes a fan casing or outer nacelle 212, attached to a core 214 of the electric fan 200 through one or more struts or outlet guide vanes 216. For the embodiment depicted, the outer nacelle 212 substantially completely surrounds the fan 204, and particularly the plurality of fan blades 208. Accordingly, for the embodiment depicted, the electric fan 200 may be referred to as a ducted electric fan.

Referring still particularly to FIG. 3, the fan shaft 210 is mechanically coupled to the electric motor 206 within the core 214, such that the electric motor 206 drives the fan 204 through the fan shaft 210. The fan shaft 210 is supported by one or more bearings 218, such as one or more roller bearings, ball bearings, or any other suitable bearings. Additionally, the electric motor 206 may be an inrunner electric motor (i.e., including a rotor positioned radially inward of a stator), or alternatively may be an outrunner electric motor (i.e., including a stator positioned radially inward of a rotor). Further, as will be discussed in greater detail, below, the electric motor 206 is electrically coupled to the power bus 58 for receiving the alternating current electrical power from the power bus 58 (i.e., the alternating current electrical power generated by the electric generator 56).

It should be appreciated, however, that the exemplary electric fan 200 depicted in FIG. 3 is provided by way of example only. In other exemplary embodiments, the electric fan 200 may have any other suitable configuration. For example, in other exemplary embodiments, the electric fan 200 may be configured as an unducted electric fan (i.e., not including the outer nacelle 212). Additionally, or alternatively, in other exemplary embodiments the electric fan 200 may include other components not shown, such as one or more inlet guide vanes positioned upstream of the plurality of fan blades 208. Furthermore, in such an embodiment, or in alternative embodiments, one or more of the components of the electric fan 200 may be variable geometry components. For example, in certain exemplary embodiments, the electric fan 200 may include variable inlet guide vanes (e.g., inlet guide vanes configured to vary a pitch) and/or the electric fan 200 may include one or more variable outlet guide vanes (i.e., outlet guide vanes, such as outlet guide vanes 216, configured to vary a pitch). Further, still, although the electric propulsor assembly is depicted as an electric fan 200, in other exemplary embodiments, any other suitable electric fan assembly may be provided.

A propulsion system in accordance with one or more of the above embodiments may be referred to as a gas-electric, or hybrid, propulsion system, given that a first propulsor assembly is configured as a turbofan engine mounted to a first side of an aircraft and a second propulsor assembly is configured as an electrically driven fan mounted to a second side of the aircraft.

Referring generally to FIGS. 1 through 3, it will be appreciated that the propulsion system 50 further includes a controller 62. The controller 62 is operably connected to the first propulsor assembly 52 and the second propulsor assembly 54. For example, referring briefly to FIG. 2, the controller 62 may be operably connected to one or more sensors 64 positioned within the combustion engine/turbomachine 102 or operable with the electric generator 56. For example, the one or more sensors 64 may determine a rotational speed of the electric generator, or one or more components of the turbomachine (such as one or more of shafts 122, 124). Additionally, referring briefly to FIG. 3, the controller 62 may be operably connected to one or more sensors 66 positioned within the electric propulsor assembly/electric fan 200. For example, the controller 62 may be operably connected to the electric motor 206 of the electric fan 200 and may, e.g., determine a rotational speed of the electric motor 206. Further, as is depicted, the controller 62 may be operably connected to one or more variable geometry components of the electric fan 200, which for the embodiment depicted includes the variable pitch fan 204, or more specifically, the pitch change mechanism 211. Furthermore, referring back to FIG. 1, the controller 62 may further be operably connected to the power bus 58. For example, the controller 62 may be operably connected to a sensor 68 operably connected to one or more electrical lines 60 of the power bus 58 to determine an amount of electrical power provided therethrough (e.g., current, voltage, etc.). It will be appreciated that the controller 62 may be integrated into a controller for the aircraft 10 or the turbofan engine 100, or alternatively may be a stand alone controller. Further, the controller 62 may be operably connected to the various sensors and components through one or more suitable wired or wireless communications busses.

Referring still generally to FIGS. 1 through 3, as will be discussed in greater detail below, the exemplary propulsion system 50 depicted is configured as an alternating current, hybrid electric propulsion system. More specifically, the exemplary propulsion system 50 depicted is configured to generate alternating current electric power through the electric generator 56 and transfer the alternating current electric power generated through the power bus 58 (in alternating current form) to the electric motor of the electric propulsor assembly (i.e., the electric motor 206 of the electric fan 200 for the embodiment depicted), to power the electric motor using such alternating current electrical power. A propulsion system 50 operating in such a manner may have multiple benefits over a traditional system transmitting such electrical power in direct current form. For example, an alternating current electrical power system, such as the one described above with reference to FIGS. 1 through 3, may be lighter as less power electronics, such as power converters and/or DC breakers, are required for operation.

Additionally, other benefits may be available as well. For example, for the exemplary propulsion system 50 described above with reference to FIGS. 1 through 3, the electric generator 56 is configured as a variable frequency electric generator configured to generate alternating current electrical power at various frequencies (e.g., proportional to a rotational speed of the turbomachine 102). Additionally, the power bus 58 is configured to transmit the alternating current electrical power from the electric generator 56 to the electric motor of the electric propulsor assembly (i.e., the electric motor 206 of the electric fan 200 for the embodiment depicted) at the various frequencies at which it is generated. As will be appreciated, powering an electric motor of the present disclosure using various frequencies will result in the electric motor rotating at various rotational speeds corresponding to the various frequencies (as there are no power electronics provided to modify the frequency of the alternating current electrical power provided). Accordingly, a rotational speed of a propulsor (i.e., the fan 204 of the electric fan 200 for the embodiment depicted) may effectively be passively controlled by modifying a rotational speed of the turbomachine 102, and thus of the electric generator 56. Notably, such a configuration may additionally allow for a rotational speed of the propulsor and electric motor of the electric propulsor assembly to be gradually increased with a rotational speed of the electric generator 56. This may reduce a potential influx of electrical current to the electric motor of the electric propulsor assembly (compare with a scenario where electrical power is first provided to the electric propulsor assembly while the electric generator is operating at a full rotational speed, generating a maximum amount of electrical power).

It should be appreciated, however, that in other exemplary embodiments the exemplary propulsion system 50 may have any other suitable configuration, and further, may be integrated into an aircraft 10 in any other suitable manner. For example, referring now to FIG. 4, an aircraft 10 and propulsion system 50 in accordance with another exemplary embodiment of the present disclosure is depicted. The exemplary aircraft 10 and propulsion system 50 of FIG. 4 may be configured in substantially the same manner as the exemplary aircraft 10 and propulsion system 50 of FIGS. 1 through 3, and accordingly, the same or similar numbers may refer to same or similar parts.

Figure 4:
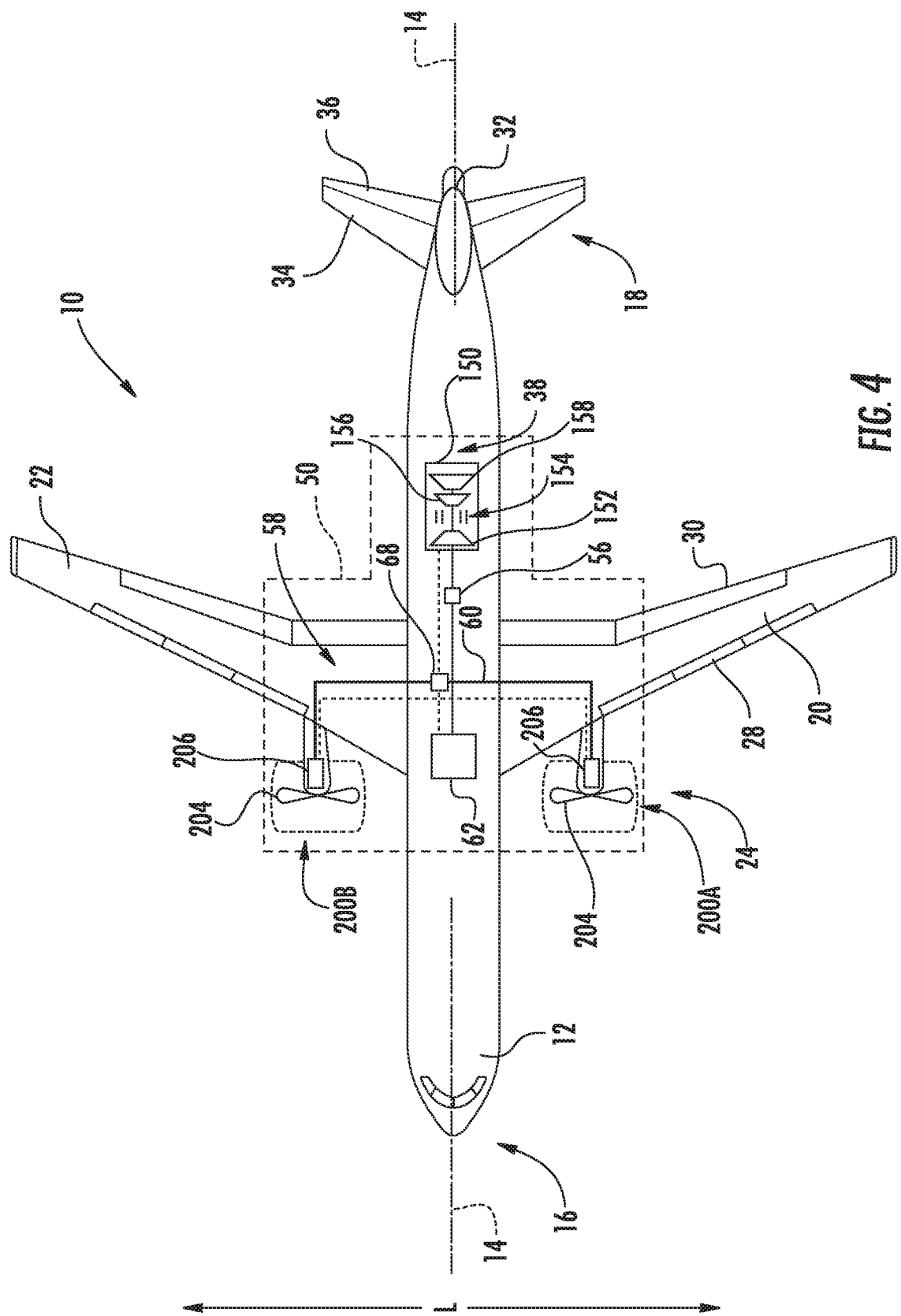
FIG. 4 is a top view of an aircraft according to another exemplary embodiment of the present disclosure.

For example, the exemplary aircraft 10 of FIG. 4 generally includes a fuselage 12 extending along a longitudinal centerline 14 of the aircraft 10 between a forward end 16 of the aircraft 10 and an aft end 18 of the aircraft 10. Additionally, the exemplary aircraft 10 includes a port side wing 20 and a starboard side wing 22, each of which extending laterally outwardly from the fuselage 12. At the aft end 18 of the aircraft 10, the aircraft 10 includes a plurality of stabilizers, or more specifically, a pair of horizontal stabilizers 34 and a vertical stabilizer 32. Furthermore, the exemplary aircraft 10 includes a propulsion system 50 having a combustion engine, an electric generator 56 mechanically driven by the combustion engine, a power bus 58 electrically connected to the electric generator 56, and an electric propulsor assembly (see, e.g., the second propulsor assembly 54 in FIG. 1).

However, for the embodiment of FIG. 4, the combustion engine of the propulsion system 50 is not configured as part of a first propulsor assembly (see, e.g., first propulsor assembly 52 of FIG. 1), and instead is configured as a turboshaft engine 150. As is depicted schematically, the exemplary turboshaft engine 150 generally includes a compressor 152, a combustion section 154, an HP turbine 156, and an LP turbine 158. In certain embodiments, the LP turbine 158 may be mechanically coupled to the electric generator 56 for driving the electric generator 56. Additionally, although the turboshaft engine 150 of FIG. 4 is depicted positioned within the fuselage 12 of the aircraft 10, in other exemplary embodiments, the turboshaft engine 150, or other combustion engine, may be positioned at any other suitable location within the aircraft 10.

Additionally, for the embodiment of FIG. 4, the electric propulsion assembly includes a plurality of electric fans 200, with each electric fan including an electric motor 206 and a propulsor (e.g., a fan 204), with the propulsor of each electric fan 200 drivingly connected to a respective electric motor 206. More specifically, for the embodiment depicted, the electric propulsion assembly includes a first electric fan 200A mounted to the port side wing 20 in an under-wing configuration and a second electric fan 200B mounted to the starboard side wing 22, also in an under-wing configuration. It should be appreciated, however, that in other exemplary embodiments the propulsion system 50 may instead include any other suitable configuration. For example, in other embodiments, the electric propulsor assembly may include any other suitable number of electric fans 200, with each including a respective electric motor 206, propulsor, etc. Additionally, one or more of these electric fans 200 may be mounted at any other suitable location, such as to the vertical stabilizer 32 of the aircraft 10, or directly to the fuselage 12 at the aft end 18 of the aircraft 10.

Notably, as discussed above, a frequency of the alternating current electric power generated by the electric generator may affect a rotational speed of the electric motor. For example, referring now to FIG. 5, a schematic, axial cross-sectional view of an electric machine 300 in accordance with an embodiment of the present disclosure is provided. The exemplary electric machine 300 of FIG. 5 may generally be referred to as a synchronous electric machine, including a rotor 302 positioned inward of a stator 304 along the radial direction R2 of the electric machine 300. The rotor 302 is rotatable about a central axis 306 of the electric machine 300 in a circumferential direction C2 of the electric machine 300. As will be appreciated, the rotor 302 includes a plurality of magnets 308, which may be permanent magnets or electromagnets. Additionally, the stator 304 includes multiphase alternating current electromagnets 310. When the electric machine 300 is utilized as an electric motor, the alternating current electromagnets 310 of the stator 304 create a magnetic field that rotates in time with the oscillations of the current of the alternating current electric power provided to the electric motor, with the rotating magnetic field acting on the magnets 208 of the rotor 302 to rotate the rotor 302. By contrast, when utilized as an electric generator, rotation of the magnets 308 on the rotor 302 creates a rotating magnetic field which drives an alternating current through the alternating current electromagnets 310 to create alternating current electric power.

Figure 5:
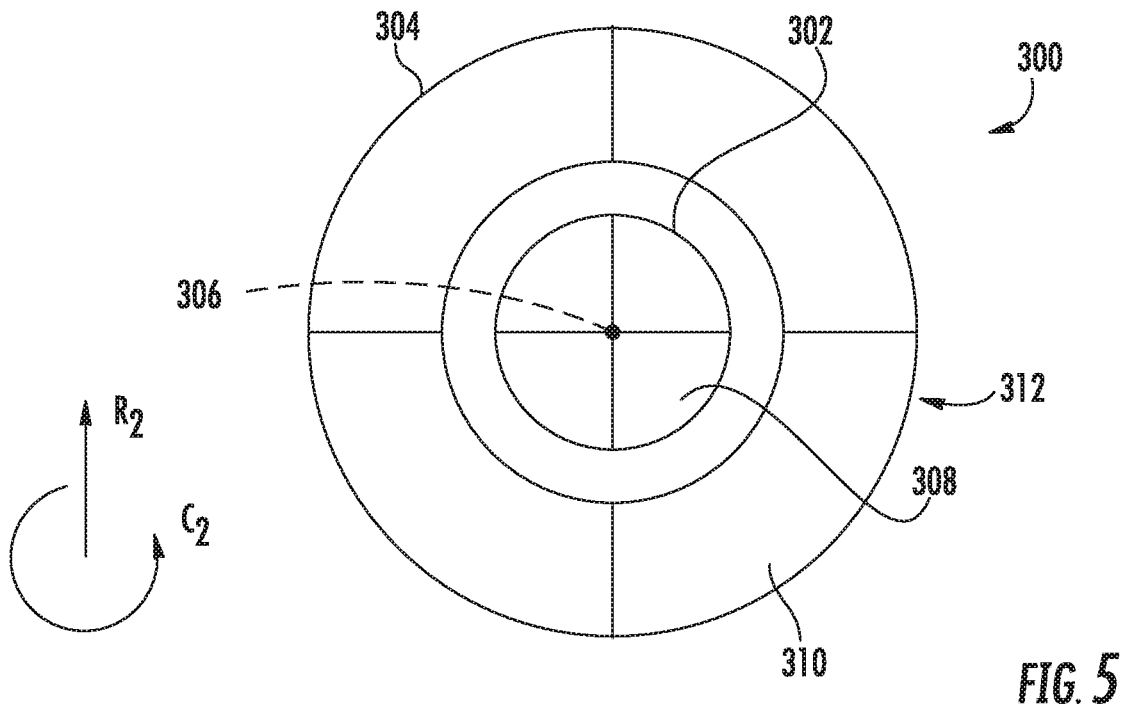
FIG. 5 is a schematic, axial cross-sectional view of an electric machine in accordance with an exemplary embodiment of the present disclosure.

It will be appreciated that the electric machine 300 of FIG. 5 includes a plurality of poles 312, such that the electric machine 300 defines a number of poles, np, or a pole count. For the embodiment of FIG. 5, the electric machine 300 includes four poles 312, defining a pole count of four. The electric machine 300 of FIG. 5 may be incorporated as either an electric motor or an electric generator in a propulsion system in accordance with an embodiment of the present disclosure. When an electric motor of the propulsion system (e.g., electric motor 206 of propulsion system 50) is configured as a synchronous alternating current electric motor, similar to the electric machine 300 depicted, having the same number of poles, np, as the electric generator (e.g., electric generator 56 of propulsion system 50), the electric motor will rotate at substantially the same rotational speed as the electric generator. Additionally, it will be appreciated that the rotational speed of the electric motor will be dictated by a frequency of the alternating current electric power provided to the electric motor.

It should be appreciated, however, that in other embodiments, the electric motor may include a number of poles, np, that is different than a number of poles, np, of the electric generator. For example, referring now to FIG. 6, a schematic, axial cross-sectional view of an electric machine 300 in accordance with another exemplary embodiment of the present disclosure is provided. The exemplary electric machine 300 may be configured in substantially the same manner as exemplary electric machine 300 described above with reference to FIG. 5. For example, the exemplary electric machine 300 includes a rotor 302 positioned within a stator 304 along the radial direction R2, the rotor 302 being rotatable relative to the stator 304 about a centerline axis 306 in the circumferential direction C2. Additionally, the exemplary electric machine 300 of FIG. 6 includes a plurality of poles 312, defining a number of poles, np. However, for the embodiment of FIG. 6, the number of poles, np, of the electric machine 300 is different than the number of poles, np, of the electric machine 300 of FIG. 5. More specifically, for the embodiment of FIG. 6, the electric machine 300 includes eight poles 312.

Figure 6:
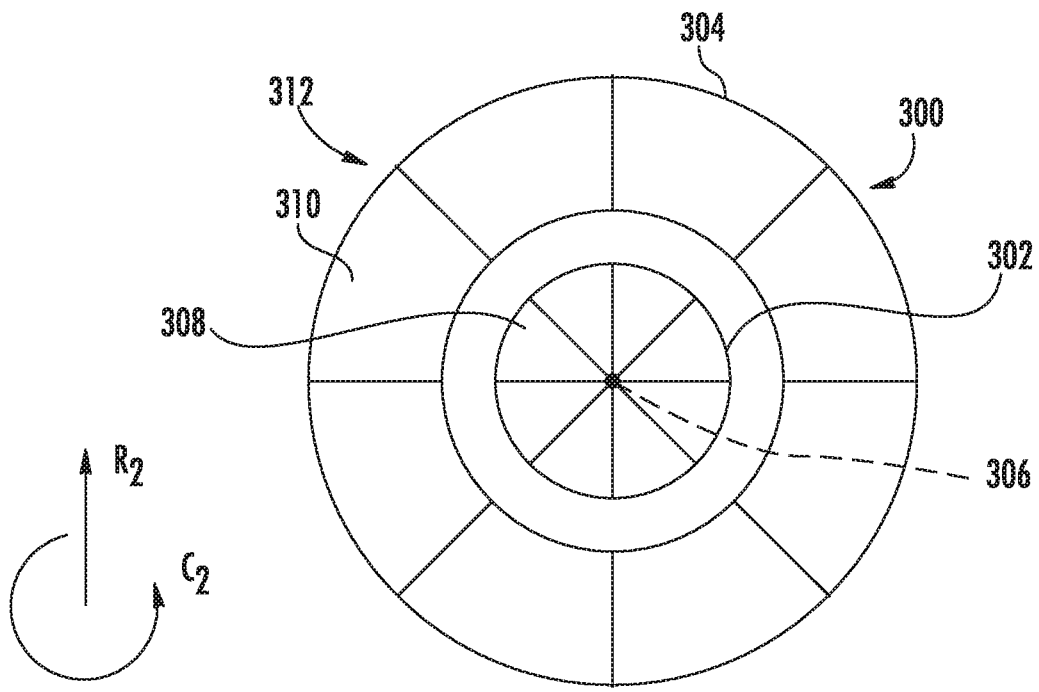
FIG. 6 is a schematic, axial cross-sectional view of an electric machine in accordance with another exemplary embodiment of the present disclosure.

For example, in certain embodiments, the electric machine 300 of FIG. 6 may be configured as the electric motor of the propulsion system (e.g., electric motor 206 of propulsion system 50) and the electric machine 300 of FIG. 5 may be configured as the electric generator of the propulsion system (e.g., electric generator 56 of propulsion system 50). Accordingly, with such an embodiment, a number of poles, np, of the electric generator may be less than a number of poles, np, of the electric motor. More particularly, the number of poles, np, of the electric generator may be half the number of poles, np, of the electric motor. With such a configuration, the electric motor may rotate more quickly than the electric generator. For example, with such an embodiment, wherein the electric motor is configured as a synchronous alternating current electric motor having two times the number of poles, np, as the electric generator, the electric motor will rotate at substantially twice the speed as the electric generator. Accordingly, the mismatch in numbers of poles, np, between the electric motor and the electric generator effectively acts as a gearbox for the propulsion system to vary a rotational speed of the electric motor relative to a rotational speed of the electric generator. Notably, as used herein, the rotational speed of the electric machine 300 (e.g., electric motor or electric generator) refers to a rotational speed of the rotor 302 of the electric machine 300 about the axis 306.

Notably, however, in other exemplary embodiments a ratio of a number of poles, np, of the electric generator to a number of poles, np, of the electric motor may not be 1:2. For example, in other exemplary embodiments, the ratio of the number of poles, np, of the electric generator to the number of poles, np, of the electric motor may be any suitable number of less than 1:1 (e.g., wherein the electric generator is configured as the electric machine 300 of FIG. 5 and the electric motor is configured as the electric machine 300 of FIG. 6), or any suitable number greater than 1:1 (e.g., wherein the electric generator is configured as the electric machine 300 of FIG. 6 and the electric motor is configured as the electric machine 300 of FIG. 5). For example, in certain embodiments, the ratio of the number of poles, np, of the electric generator to the number of poles, np, of the electric motor may be between 10:1 and 1:10, such as between 8:1 and 1:8, between 4:1 and 1:4, or between 3:1 and 1:3.

Figure 7:
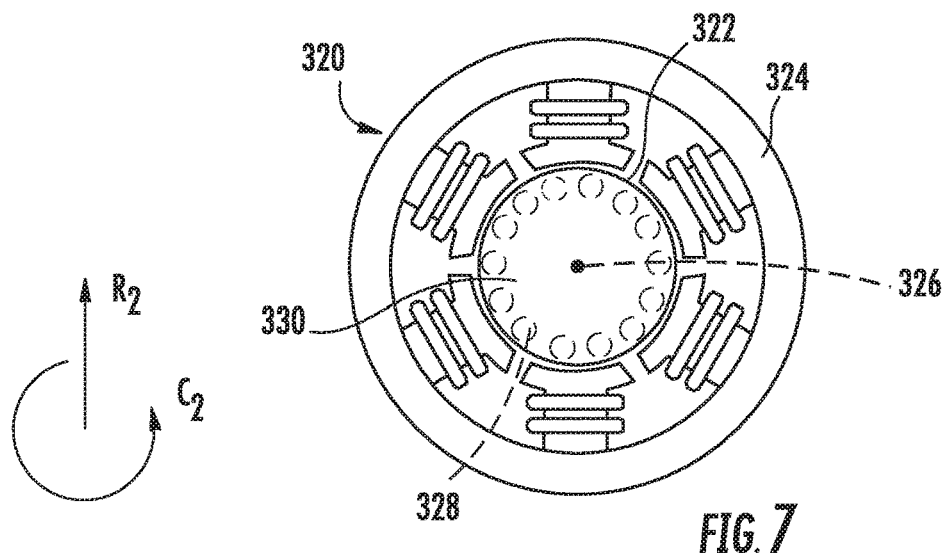
FIG. 7 is a schematic, axial cross-sectional view of an electric machine in accordance with yet another exemplary embodiment of the present disclosure.

Furthermore, it should be appreciated that in certain exemplary embodiments, any other suitable type of alternating current electric machine may be utilized for the electric motor and/or the electric generator. For example, referring now to FIG. 7, a schematic, axial cross-sectional view of an electric machine 320 in accordance with another exemplary embodiment of the present disclosure is provided. The exemplary electric machine 320 of FIG. 7 may generally be referred to as an asynchronous electric machine, the electric machine 320 including a rotor 322 positioned inward of a stator 324 along a radial direction R2, and rotatable relative to the stator 324 about a central axis 326 in a circumferential direction C2. In such a manner, the exemplary electric machine 320 of FIG. 7 is similar to the exemplary electric machines 300 of FIGS. 5 and 6. However, as stated, for the embodiment of FIG. 7 the electric machine 320 is configured as an asynchronous/induction alternating current electric machine 320. Accordingly, instead of including one or more permanent magnets or electromagnets with the rotor 322, the rotor 322 is configured with a plurality of conductors 328 (depicted in phantom in FIG. 7) embedded or otherwise positioned in a cylindrical core 330.

Figure 8:
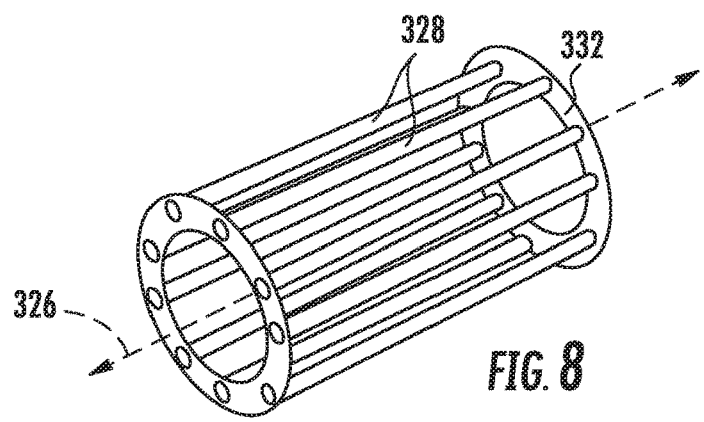
FIG. 8 is a perspective view of a rotor in accordance with an embodiment of the present disclosure as may be incorporated in the exemplary electric machine of FIG. 7.

In certain embodiments, the rotor 322 of the alternating current induction electric machine 320 may be configured as a "squirrel-cage rotor". An example of this embodiment is shown in FIG. 8. As shown, the conductors 328 may extend longitudinally, with shorting rings 332 at opposing ends along the axis 326. When utilized as an electric motor (e.g., electric motor 206 of propulsion system 50), shorting the longitudinal conductors 328 using the shorting rings 332 at the opposing ends allows for the opposing magnetic fields provided by the stator 324 to induce an electric current through the conductors 328, generating movement. As will be appreciated, the operation is switched when utilized as an electric generator (e.g., electric generator 56 of propulsion system 50). Although depicted without a core 330 in FIG. 8, the conductors 328 and shorting rings 332 are typically positioned within, e.g. an iron core, to carry a magnetic field through the rotor 322—the core 330 typically being formed of laminations separated by, e.g., varnish or some other insulation.

Figure 9:
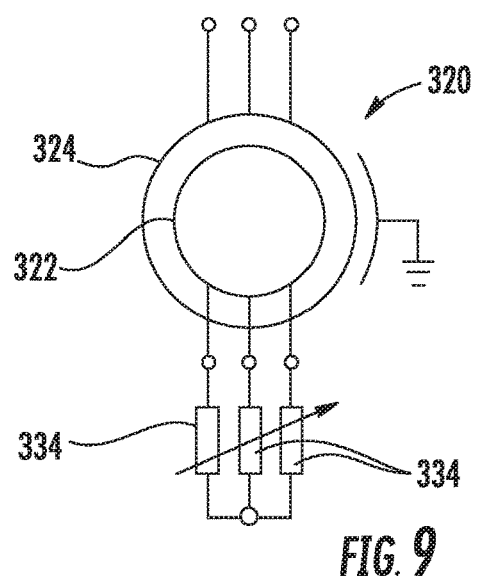
FIG. 9 is a schematic view of one exemplary embodiment of the exemplary electric machine of FIG. 7.

In other embodiments, the rotor 322 of the alternating current induction electric machine 320 may be configured as a "wound rotor", with such an electric machine 320 sometimes also being referred to as a wound field electric machine. An example of this embodiment is shown schematically in FIG. 9. With such an embodiment, the rotor windings, or conductors 328, are connected through supply rings to external variable resistors 334. The external variable resistors 334 may vary their resistance to control a speed and/or torque characteristic of the electric machine 320 when utilized as an electric motor (e.g., electric motor 206 of propulsion system 50), or to control an alternating current electrical output when utilized as an electric generator (e.g., generator 56 of propulsion system 50). Although not depicted, the variable resistors 334 may be operably connected to, and controlled by, the controller 62 of the propulsion system 50.

Regardless of the form of the rotor 322, it will be appreciated that an alternating current induction electric machine 320 when under a load operates with a slip, s. The slip, s, may be expressed as the difference between a synchronous speed, ns, of the electric machine 320 and actual operating speed, no, of the electric machine, divided by the synchronous speed, ns [s=(ns−no)/ns]. When utilized as an electric motor, the slip, s, of the alternating current induction electric motor determines a torque of the electric motor. A relatively small slip, s, induces a relatively large current in the rotor 322 that produces a relatively large torque. Additionally, it will be appreciated that alternating current induction electric machines 320 typically define a slip range at which they operate at maximum efficiency. Accordingly, the propulsion system may be operated to maintain a slip, s, of the alternating current induction electric machine 320 within the desired slip range. The slip range may be between 0% and 8%, such as between 0% and 6%, such as between 0% and 3%.

Notably, as will be described in greater detail below, a propulsion system (e.g., propulsion system 50) including one or more asynchronous electric machines 320 may be operated to maintain a slip, s, of one or more of the electric machines 320 within the desired slip range. For example, when the electric motor of the electric propulsor assembly (e.g., electric motor 206) is configured as an alternating current induction electric machine 320, the propulsion system may be configured to modify a variable geometry component of the electric propulsor assembly (e.g., electric fan 200) in order to increase or decrease a load on the electric motor to maintain a slip, s, of the electric motor within the desired slip range. More specifically, in certain embodiments, the propulsion system may be configured to change a pitch of a plurality of blades of a fan (e.g., change a pitch P2 of fan blades 208 of the fan 204 of the electric fan 200) of the electric propulsor assembly to increase or decrease a load on the electric motor to maintain a slip, s, of the electric motor within a desired slip range.

It should be appreciated, however, that in other exemplary embodiments, any other suitable variable geometry component may be modified to maintain the slip, s, of the electric motor within the desired slip range. For example, in other embodiments, the propulsion system may be configured to modify one or more variable inlet guide vanes of the electric propulsor assembly, one or more variable outlet guide vanes of the electric propulsor assembly, etc.

Figure 10:
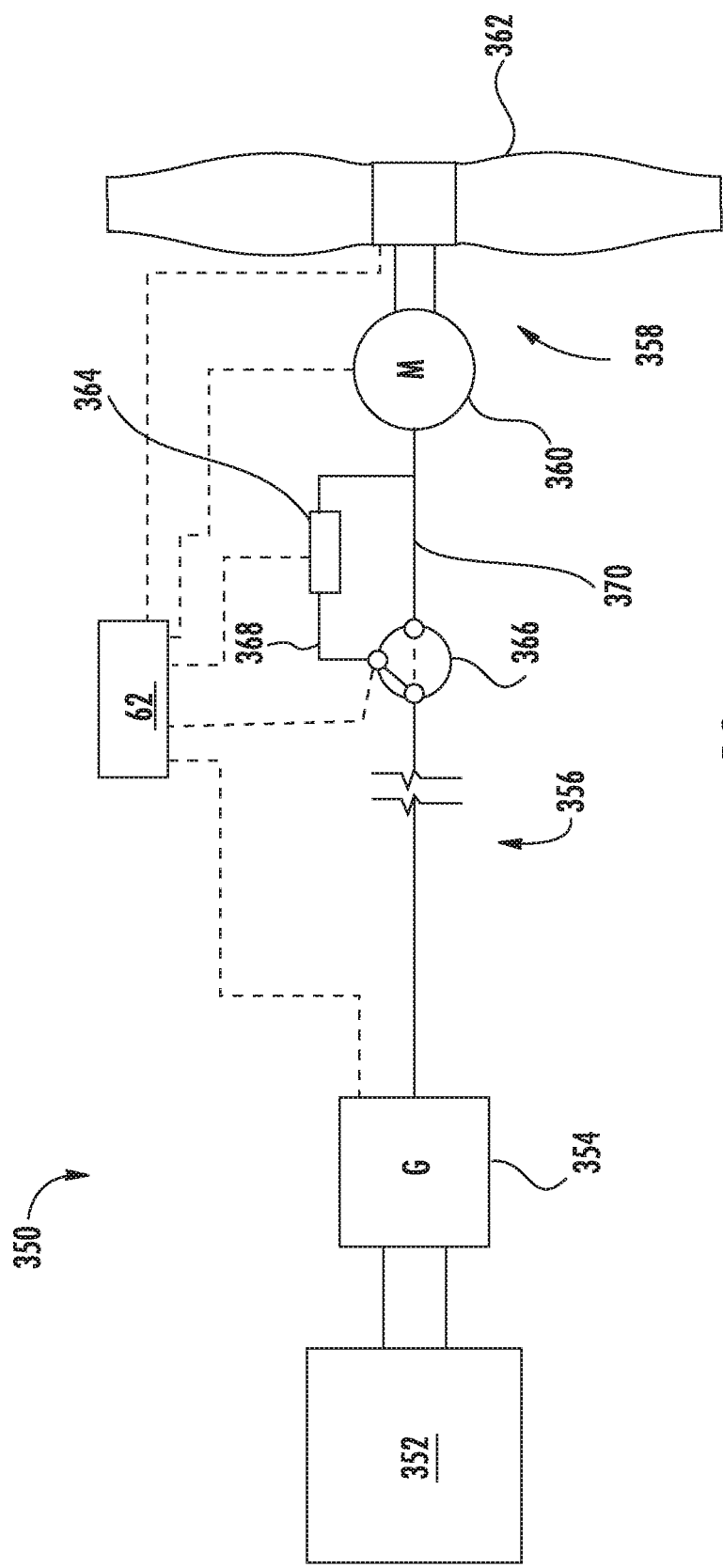
FIG. 10 is a schematic view of a propulsion system in accordance with an exemplary embodiment of the present disclosure.

Referring now to FIG. 10, a schematic view of a propulsion system 350 for an aircraft in accordance with another exemplary embodiment of the present disclosure is provided. The exemplary propulsion system 350 of FIG. 10 may be configured in substantially the same manner as one or more of the exemplary propulsion systems 50 described above. For example, the exemplary propulsion system 350 generally includes a combustion engine 352 (such as a turboshaft engine, a turbofan engine, a turboprop engine, etc.); an electric generator 354 mechanically driven by the combustion engine 352 and configured to generate alternating current electric power; a power bus 356 electrically connected to the electric generator 354 and configured to receive and transmit the alternating current electric power generated by the electric generator 354; and an electric propulsor assembly 358 having an electric motor 360 and a propulsor 362 drivingly connected to the electric motor 360, with the electric motor 360 electrically coupled to the power bus 356 for receiving alternating current electric power from the power bus 356. Notably, although not depicted, the power bus 356 of the propulsion system 350 may further include a power converter electrically connected to the electric generator 354 for, e.g., receiving alternating current electrical power from the electric generator 354 at a variety of frequencies, and converting such alternating current electrical power received from the electric generator 354 to a constant frequency.

However, for the embodiment depicted, at least one of the power bus 356 or the electric propulsor assembly 358 further includes a current limiting means 364 connect in series with the electric motor 360 of the electric propulsor assembly 358 for limiting a current provided to the electric motor 360. For the embodiment depicted, the current limiting means 364 includes at least one of a resistor or a power converter connectable in series with the electric motor 360 of the electric propulsor assembly 358. More specifically, for the embodiment depicted, the current limiting means 364 includes a resistor connectable in series with the electric motor 360 of the electric propulsor assembly 358. The resistor may be a fixed resistance resistor, or alternatively may be a variable resistance resistor (although depicted schematically as a fixed resistance resistor).

As stated, the current limiting means 364 is connectable in series with the electric motor 360. For the embodiment depicted, the power bus 356 includes a switch 366 movable between two parallel electrical paths to provide the alternating current electric power to the electric motor 360. More specifically, the switch 366 is movable between a first position such that the alternating current electric power travels through a first path 368 to the electric motor 360, the first path 368 including the resistor connected in series with the electric motor 360, and a second position such that the alternating current electric power travels through a second path 370 bypassing the resistor. The switch 366 is shown in the first position, and is depicted in phantom in the second position.

Notably, for the embodiment depicted, the propulsion system 350 further includes a controller 62 operably connected to one or more components of the propulsion system 350. More specifically, the controller 62 is depicted operably connected to the electric generator 354, the switch 366 of the power bus 356, the current limiting means 364 (i.e., the resistor for the embodiment depicted), the electric motor 360, and the propulsor 362. With such a configuration, the controller 62 may be configured to engage the current limiting means 364 (i.e., the resistor for the embodiment depicted) when the electric motor 360 is at risk of receiving an influx of relatively high current, potentially damaging the electric motor 360.

In one embodiment of the present disclosure, the controller 62 may determine the electric motor 360 is at risk of receiving an influx of relatively high current when the electric motor 360 is operating below a predetermined threshold of an operating speed of the electric generator 354. For example, the controller 62 may determine a rotational speed of the electric generator 354 and a rotational speed of the electric motor 360, and may move the switch 366 to the first position to connect the current limiting means 364 in series with the electric motor 360 when the rotational speed of the electric motor 360 is below a predetermined threshold of the rotational speed of the electric generator 354. Notably, when the current limiting means 364 is a variable resistance resistor, the controller 62 may further be configured to modify a resistance of the resistor to accordingly modify an amount of current provided to the electric motor 360.

Additionally, or alternatively, the controller 62 may further modify one or more variable geometry components of the propulsor assembly 358 to modify a load on the electric motor 360 when, e.g., the controller 62 determines the electric motor 360 is at risk receiving an influx of relatively high current, or when the electric motor 360 is operating outside a desired slip range (i.e., when the electric motor 360 is an asynchronous electric motor).

Accordingly, with one or more of the above embodiments, the propulsion system may be configured to minimize or reduce an inrush of electric current to the electric motor during operation of the propulsion system, such that the electric motor is not required to be designed to accommodate such an inrush. Therefore, such a configuration may result in a lighter electric motor. Additionally, or alternatively, with certain of these embodiments, the propulsion system may be configured to maintain a slip of the electric motor within a desired slip range to increase an efficiency of the electric motor and the propulsion system as a whole.

Figure 11:
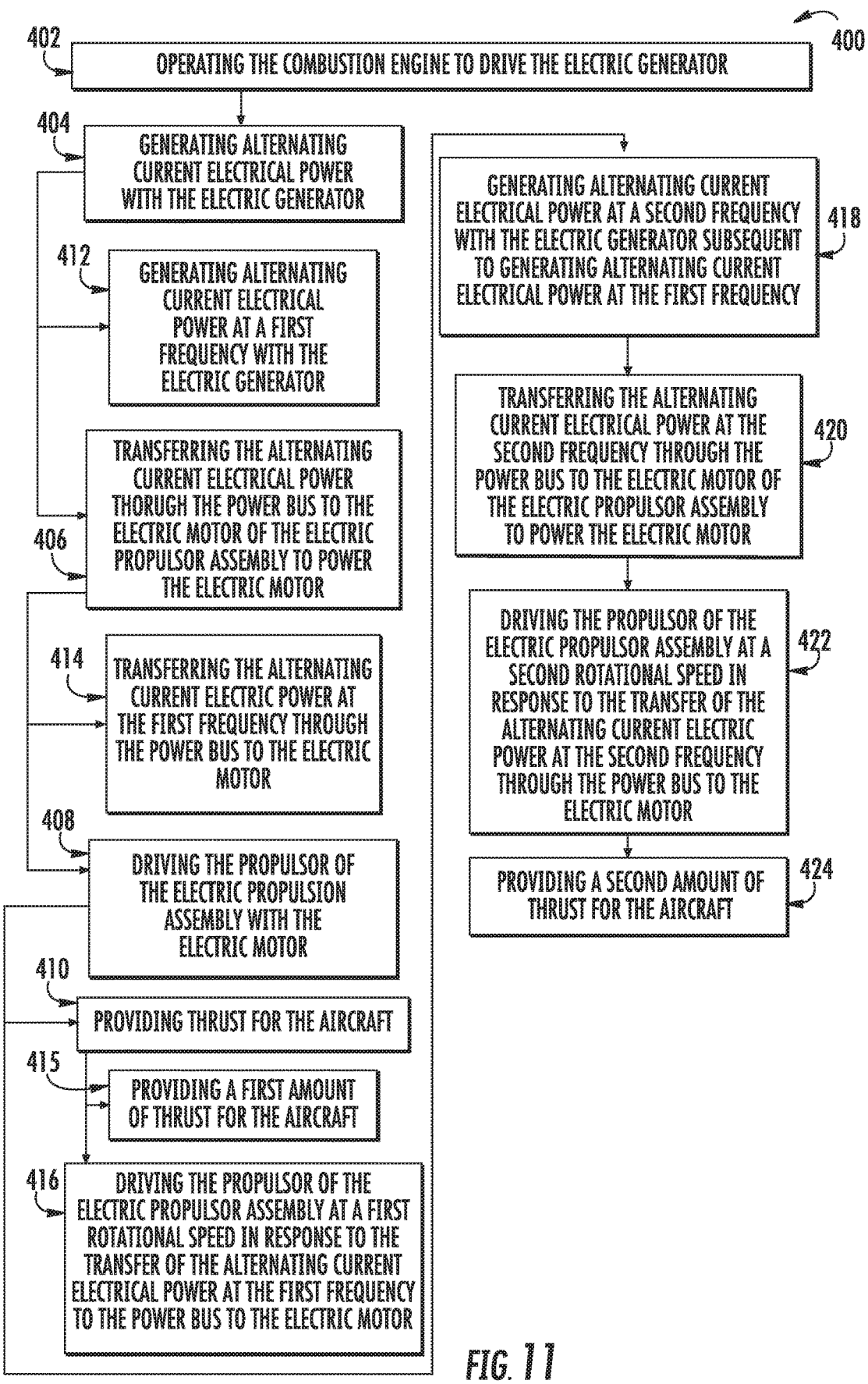
FIG. 11 is a flow diagram of a method for operating a propulsion system in accordance with an exemplary aspect of the present disclosure.

Referring now to FIG. 11, a method 400 for operating a propulsion system of an aircraft in accordance with an exemplary aspect of the present disclosure is provided. In certain exemplary embodiments the propulsion system and/or aircraft may be configured in a manner similar to one or more the exemplary propulsion systems and/or aircraft described above. Accordingly, for example, the propulsion system may include a combustion engine, an electric generator mechanically driven by the combustion engine, a power bus, and an electric propulsor assembly having an electric motor and a propulsor.

As is depicted, the exemplary method 400 includes at (402) operating the combustion engine to drive the electric generator and at (404) generating alternating current electrical power with the electric generator. Further, the exemplary method 400 includes at (406) transferring the alternating current electrical power through the power bus to the electric motor of the electric propulsor assembly to power the electric motor, and further at (408) driving the propulsor of the electric propulsion assembly with the electric motor. Notably, for the aspect depicted, transferring the alternating current electrical power at (406) includes transferring the alternating current electrical power entirely in alternating current form. Additionally, for the embodiment depicted, driving the propulsor of the electric propulsion assembly with the electric motor at (408) further includes at (410) providing thrust for the aircraft.

Notably, for the exemplary aspect of FIG. 11, the propulsion system is a variable frequency propulsion system, and more specifically, the electric motor is configured as a variable frequency electric motor and the electric generator is configured as a variable frequency electric generator.

For example, for the exemplary aspect of FIG. 11, generating alternating current electrical power with the electric generator at (404) includes at (412) generating alternating current electrical power at a first frequency with the electric generator; transferring the alternating current electrical power through the power bus to the electric motor at (406) includes at (414) transferring the alternating current electric power at the first frequency through the power bus to the electric motor; and driving the propulsor of the electric propulsion assembly with the electric motor at (408) includes at (416) driving the propulsor of the electric propulsor assembly at a first rotational speed in response to the transfer of the alternating current electrical power at the first frequency to the power bus to the electric motor at (414). Accordingly, with such an exemplary embodiment it will be appreciated that providing thrust for the aircraft at (410) further includes at (415) providing a first amount of thrust for the aircraft.

In addition, the exemplary method 400 further includes at (418) generating alternating current electrical power at a second frequency with the electric generator subsequent to generating alternating current electrical power at the first frequency at (412). The second frequency of the alternating current electric power may be greater than the first frequency of alternating current electrical power, such as at least about 10% greater, at least about 20% greater, at least about 50% greater, at least about 100% greater, and up to about 10,000% greater.

The exemplary method 400 further includes at (420) transferring the alternating current electrical power at the second frequency through the power bus to the electric motor of the electric propulsor assembly to power the electric motor; and at (422) driving the propulsor of the electric propulsor assembly at a second rotational speed in response to the transfer of the alternating current electric power at the second frequency through the power bus to the electric motor. Similarly, for the embodiment depicted, driving the propulsor of the electric propulsor assembly at the second rotational speed at (422) includes at (424) providing a second amount of thrust for the aircraft. The second amount of thrust may be greater than the first amount of thrust provided at (415), such as at least about 5% greater, at least about 10% greater, at least about 20% greater, at least about 50% greater, and up to about 1,000% greater.

It will be appreciated that operating a propulsion system in accordance with the above exemplary aspect may allow for a more efficient propulsion system. More specifically, by generating electrical power in alternating current form, transferring the electric power also in alternating current form, and providing the electrical power to the electric motor in alternating current form may allow for a lighter and therefore overall more efficient propulsion system. More specifically, still, such a propulsion system may not require relatively heavy power inverters and converters to switch electrical power generated from alternating current form to direct current form and then back to alternating current form during operation.

Further, operating the propulsion system in accordance with the exemplary aspect depicted may allow for the propulsion system to effectively control a speed of the electric motor passively using the electric generator. For example, as a speed of the electric generator increases, a frequency of the electrical power generated by the electric generator also increases, and the increased frequency of electrical power provided to the electric motor correspondingly increases a speed of the electric motor. The inverse is true as well.

However, in other exemplary aspects of the present disclosure, the method 400 may not include transferring the alternating current electrical power at the second frequency through the power bus to the electric motor at (420). Instead, in other exemplary aspects, the method 400 may include converting the alternating current electrical power generated at the second frequency to alternating current electrical power at the first frequency using a power converter, and subsequently transferring the converted alternating current electrical power at the first frequency through the power bus to the electric motor of the electric propulsor assembly to power the electric motor.

Figure 12:
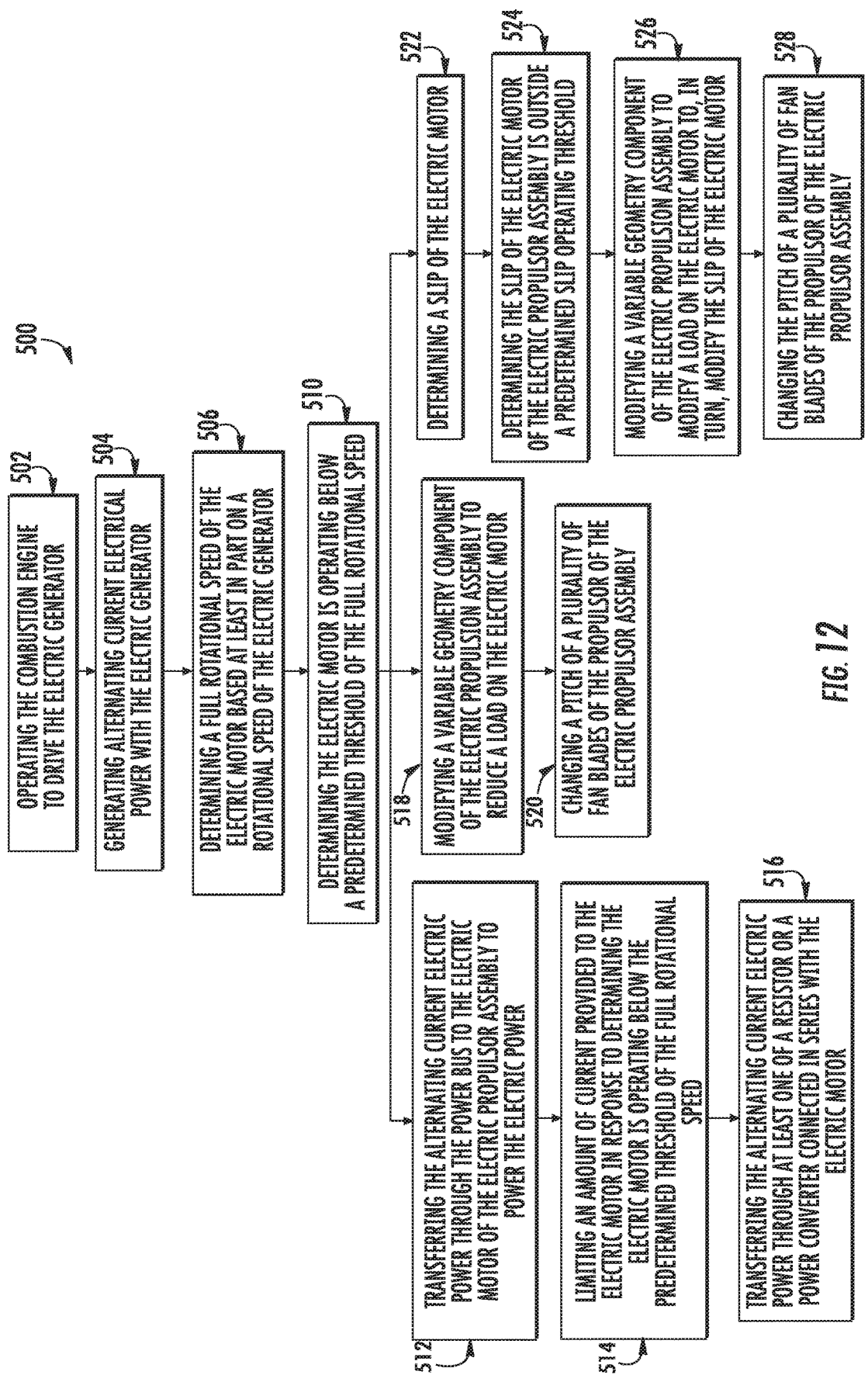
FIG. 12 is a flow diagram of a method for operating a propulsion system in accordance with another exemplary aspect of the present disclosure.

Referring now to FIG. 12, a method 500 of operating a propulsion system of an aircraft in accordance with another exemplary aspect of the present disclosure is provided. The exemplary method 500 may also be utilized with one or more of the exemplary embodiments described above, and accordingly, for the exemplary aspect of FIG. 12, the propulsion system may generally include a combustion engine, an electric generator, a power bus, and an electric propulsor assembly.

The method 500 includes at (502) operating the combustion engine to drive the electric generator, and at (504) generating alternating current electrical power with the electric generator. Notably, in certain exemplary aspects, the exemplary method 500 may further include determining a system parameter. For example, the method 500 may further include determining a rotational speed of one or more components of the gas turbine engine (such as a rotational speed of the high pressure spool), a load on the gas turbine engine (e.g., a load on one or more of the low pressure spool or high pressure spool), etc. Additionally, with such an exemplary aspect, the electric motor may be a wound field electric motor, and generating alternating current electrical power with the electric generator at (504) may further include modifying a voltage of the alternating current electrical power generated with the electric generator in response to the determined system parameter. For example, generating alternating current electrical power with the electric generator at (504) may further include increasing a voltage of the alternating current electrical power generated with the electric generator in response a load on the gas turbine engine being below a predetermined threshold or decreasing a voltage of the alternating current electrical power generated with the electric generator in response a load on the gas turbine engine being above a predetermined threshold. Notably, however, in other exemplary aspects, the electric motor may be any other suitable type of electric motor.

Additionally, the exemplary method 500 is configured to reduce or minimize an influx of electric current to the electric motor during operation. More specifically, for the embodiment depicted, the exemplary method 500 includes at (506) determining a full rotational speed of the electric motor based at least in part on a rotational speed of the electric generator. The full rotational speed of the electric motor may refer to a synchronous speed of the electric motor based on the alternating current electrical power being generated by the electric generator at (504). In certain exemplary aspects, determining the full rotational speed of the electric motor at (506) may include sensing a rotational speed of one or more components indicative of a rotational speed of the electric generator, such as sensing a rotational speed of a rotor of the electric generator or one or more rotary components of the combustion engine driving the electric generator (such as an LP shaft of the machine dropping the electric generator). Alternatively, determining the full rotational speed of the electric motor at (506) may include sensing one or more characteristics of the electrical power transferred through the power bus using a power bus sensor.

Referring still to FIG. 12, the exemplary method 500 additionally includes at (510) determining the electric motor is operating below a predetermined threshold of the full rotational speed. It will be appreciated that the electric motor operating below a predetermined threshold of the full rotational speed may be indicative of the electric motor being brought up to speed, or alternatively, the electric motor being overloaded.

When for example, the electric motor is being brought up to speed, the exemplary method 500 further includes at (512) transferring the alternating current electric power through the power bus to the electric motor of the electric propulsor assembly to power the electric motor. More specifically, for the exemplary aspect depicted, transferring the alternating current electric power at (512) further includes at (514) limiting an amount of current provided to the electric motor in response to determining the electric motor is operating below the predetermined threshold of the full rotational speed at (510). For the exemplary aspect depicted, limiting the amount of current provided to the electric motor at (514) includes at (516) transferring the alternating current electric power through at least one of a resistor or a power converter connected in series with the electric motor.

When, for example, the electric motor is being overloaded, the exemplary method 500 further includes at (518) modifying a variable geometry component of the electric propulsion assembly to reduce a load on the electric motor. For example, in certain exemplary aspects, modifying the variable geometry component of the electric propulsion assembly at (518) may include at (520) changing a pitch of a plurality of fan blades of the propulsor of the electric propulsor assembly. It should be appreciated, however, that in other exemplary aspects, any other suitable variable geometry component of the electric propulsor assembly may be modified. For example, in other exemplary aspects, one or more of a variable inlet guide vane or a variable outlet guide vane, if provided, may be modified to reduce a load on the electric motor.

Notably, in certain exemplary aspects, such as when the electric motor is an alternating current induction electric motor, determining the full rotational speed of the electric motor at (510) may further include at (522) determining a slip of the electric motor. With such an exemplary aspect, the exemplary method 500 further includes at (524) determining the slip of the electric motor of the electric propulsor assembly is outside a predetermined slip operating threshold. For example, determining the slip of the electric motor of the electric propulsor assemblies outside the predetermined slip operating threshold at (524) may include determining that the slip determined at (522) is higher than the predetermined slip operating threshold, or determining that the slip determined at (522) is lower than the predetermined slip operating threshold.

Accordingly, the exemplary method 500 of FIG. 12 further includes at (526) modifying a variable geometry component of the electric propulsion assembly to modify a load on the electric motor to, in turn, modify the slip of the electric motor. In certain exemplary aspects, modifying the variable geometry of the component of the electric propulsion assembly to modify the load on the electric motor at (526) may include modifying the variable geometry component to increase a load on the electric motor, or alternatively, modifying the variable geometry component to decrease a load on the electric motor. For the embodiment depicted, modifying the variable geometry component of the electric propulsion assembly at (526) includes at (528) changing the pitch of a plurality of fan blades of the propulsor of the electric propulsor assembly. However, in other exemplary aspects, any other suitable variable geometry component of the electric propulsor assembly may be modified.

It will be appreciated that operating the electric propulsion assembly in accordance with one or more aspects the present disclosure may allow for a lighter and more efficient propulsion assembly for an aircraft. For example, in addition to the benefits of utilizing an alternating current propulsion, system capability to modify either an amount of current provided to the electric motor or a load on the electric motor may allow for the electric motor to be designed without the ability to handle and an inrush electric current, and further may allow for the electric motor to be operated in a more efficient manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A propulsion system for an aircraft, the propulsion system comprising:
   a combustion engine;
   an electric generator mechanically driven by the combustion engine, the electric generator configured to generate alternating current electrical power;
   a power bus electrically connected to the electric generator and configured to receive and transmit the alternating current electrical power generated by the electric generator;
   an electric propulsor assembly comprising an electric motor and a propulsor drivingly connected to the electric motor, the electric motor electrically coupled to the power bus for the receiving alternating current electrical power from the power bus, at least one of the power bus or the electric propulsor assembly comprising a current limiting means selectively connectable in series with the electric motor of the electric propulsor assembly for limiting a current provided to the electric motor; and
   a controller configured to determine a rotational speed of the electric generator and a rotational speed of the electric motor, and wherein the controller moves the switch to the first position to connect the current limiting means in series with the electric motor when the rotational speed of the electric motor is below a predetermined threshold of the rotational speed of the electric generator and to the second position when the rotational speed of the electric motor is above the predetermined threshold of the rotational speed of the electric generator.

2. The propulsion system of claim 1, wherein the electric generator is a variable frequency electric generator configured to generate alternating current electrical power at various frequencies, and wherein the power bus is configured to transmit the alternating current electrical power from the electric generator to the electric motor at the various frequencies.

3. The propulsion system of claim 2, wherein the electric generator is configured to generate the alternating current electrical power at various frequencies proportional to a rotational speed of the combustion engine.

4. The propulsion system of claim 1, wherein the electric generator includes a number of poles, wherein the electric motor includes a number of poles, and wherein the number of poles of the electric generator is different than the number of poles of the electric motor.

5. The propulsion system of claim 1, wherein the current limiting means comprises at least one of a resistor or a power converter selectively connectable in series with the electric motor of the electric propulsor assembly.

6. The propulsion system of claim 1, wherein the propulsor is a variable pitch propulsor.

7. The propulsion system of claim 1, wherein the combustion engine is at least one of a turboprop engine, turbofan engine, or turboshaft engine.

8. The propulsion system of claim 1, wherein the electric motor and propulsor of the electric propulsor assembly are together configured as a first electric fan, and wherein the electric propulsor assembly further comprises a second electric fan, the second electric fan similarly comprising an electric motor and a propulsor drivingly connected to the electric motor, the electric motor of the second electric fan also electrically coupled to the power bus for the receiving alternating current electrical power from the power bus.

9. A method for operating a propulsion system of an aircraft, the propulsion system comprising a combustion engine, an electric generator mechanically driven by the combustion engine, a power bus, and an electric propulsor assembly comprising an electric motor and a propulsor, the method comprising:
   operating the combustion engine to drive the electric generator;
   generating alternating current electrical power with the electric generator;
   transferring the alternating current electric power through the power bus to the electric motor of the electric propulsor assembly to power the electric motor;
   driving the propulsor of the electric propulsion assembly with the electric motor;
   determining a slip of the electric motor of the electric propulsor assembly is outside a predetermined operating slip threshold; and
   modifying a variable geometry component of the electric propulsor assembly to modify a load on the electric motor by modifying the variable geometry component of the electric propulsion assembly to modify the load on the electric motor in response to determining the slip of the electric motor of the electric propulsor assembly is outside the predetermined operating slip threshold.

10. The method of claim 9, wherein generating alternating current electrical power comprises generating alternating current electrical power at a first frequency, wherein transferring the alternating current electric power through the power bus to the electric motor comprises transferring the alternating current electric power at the first frequency through the power bus to the electric motor, and wherein the method further comprises:
   generating alternating current electrical power at a second frequency with the electric generator subsequent to generating alternating current electrical power at the first frequency; and
   transferring the alternating current electric power at the second frequency through the power bus to the electric motor of the electric propulsor assembly to power the electric motor.

11. The method of claim 10, wherein driving the propulsor of the electric propulsion assembly with the electric motor comprises driving the propulsor of the electric propulsor assembly at a first rotational speed in response to the transfer of the alternating current electric power at the first frequency through the power bus to the electric motor, and wherein the method further comprises:
   driving the propulsor of the electric propulsor assembly at a second rotational speed in response to the transfer of the alternating current electric power at the second frequency through the power bus to the electric motor.

12. The method of claim 9, further comprising:
determining a full rotational speed of the electric motor based at least in part on a rotational speed of the electric generator; and
determining the electric motor is operating below a predetermined threshold of the full rotational speed;
wherein transferring the alternating current electric power through the power bus to the electric motor comprises limiting an amount of current provided to the electric motor in response to determining the electric motor is operating below the predetermined threshold of the full rotational speed.

13. The method of claim 12, wherein limiting the amount of current provided to the electric motor comprises transferring the alternating current electric power through at least one of a resistor or a power converter to the electric motor.

14. The method of claim 9, further comprising:
determining a full rotational speed of the electric motor based at least in part on a rotational speed of the electric generator; and
determining the electric motor is operating below a predetermined threshold of the full rotational speed, wherein modifying the variable geometry component of the electric propulsion assembly to modify the load on the electric motor comprises modifying the variable geometry component of the electric propulsion assembly to reduce the load on the electric motor in response to determining the electric motor is operating below the predetermined threshold of the full rotational speed.

15. The method of claim 14, wherein modifying the variable geometry component of the electric propulsion assembly comprises changing a pitch of a plurality of blades of the propulsor of the electric propulsor assembly.

16. The method of claim 9, wherein modifying the variable geometry component of the electric propulsion assembly comprises changing a pitch of a plurality of blades of the propulsor of the electric propulsor assembly.

17. The method of claim 9, wherein the electric motor of the electric propulsor assembly is a wound field electric motor, wherein the method further comprises:
determining a system parameter, wherein generating alternating current electrical power with the electric generator further comprises modifying a voltage of the alternating current electrical power generated with the electric generator in response to the determined system parameter.

18. A propulsion system for an aircraft, the propulsion system comprising:
a combustion engine;
an electric generator mechanically driven by the combustion engine, the electric generator configured to generate alternating current electrical power and defining a number of poles;
a power bus electrically connected to the electric generator and configured to receive and transmit the alternating current electrical power generated by the electric generator;
an electric propulsor assembly comprising an electric motor and a propulsor drivingly connected to the electric motor, the electric motor electrically coupled to the power bus for the receiving alternating current electrical power from the power bus, the electric motor defining a number of poles that is different than the number of poles defined by the electric generator; and
a controller configured to alter an amount of power provided to the motor between a first amount of power when a rotational speed of the electric motor is below a predetermined threshold of the rotational speed of the electric generator and a second amount of power when the rotational speed of the electric motor is above the predetermined threshold of the rotational speed of the electric generator.

19. The propulsion system of claim 18, wherein the number of poles of the electric generator is less than the number of poles of the electric motor.

* * * * *